(12) United States Patent
Boncourt

(10) Patent No.: US 12,072,036 B2
(45) Date of Patent: Aug. 27, 2024

(54) SLIDE VALVE AND MOUNTING AID DEVICE

(71) Applicant: ZF Friedrichshafen AG, Friedrichshafen (DE)

(72) Inventor: Marcel Boncourt, Püttlingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/156,663

(22) Filed: Jan. 19, 2023

(65) Prior Publication Data

US 2023/0228340 A1 Jul. 20, 2023

(30) Foreign Application Priority Data

Jan. 20, 2022 (DE) ...................... 10 2022 200 603.8

(51) Int. Cl.
| | | |
|---|---|---|
| *F16K 27/04* | (2006.01) | |
| *F16K 11/07* | (2006.01) | |
| *F16K 31/52* | (2006.01) | |
| *F16K 31/528* | (2006.01) | |

(52) U.S. Cl.
CPC ............ *F16K 27/041* (2013.01); *F16K 11/07* (2013.01); *F16K 31/5286* (2013.01); *F16K 2200/3053* (2021.08)

(58) Field of Classification Search
CPC .... F16K 27/041; F16K 31/5286; F16K 31/60; F16H 1/0009; F16H 2057/0062; F16H 2061/0253
See application file for complete search history.

(56) References Cited

U.S. PATENT DOCUMENTS

| 3,818,926 | A | * | 6/1974 | Wohlwend | .......... F16K 31/5286 |
| | | | | | 60/427 |
| 4,007,665 | A | | 2/1977 | Orzel | |
| RE33,246 | E | * | 7/1990 | Barree | .................. F16K 11/044 |
| | | | | | 137/625.5 |
| 5,289,634 | A | | 3/1994 | Makino et al. | |
| 2011/0140026 | A1 | | 6/2011 | Togawa et al. | |
| 2016/0312909 | A1 | | 10/2016 | Martin, Jr. et al. | |
| 2019/0091611 | A1 | * | 3/2019 | Rao | ...................... B01D 29/055 |

FOREIGN PATENT DOCUMENTS

| DE | 4223298 A1 | 2/1993 |
| JP | 2011067879 A | 4/2011 |

OTHER PUBLICATIONS

German Search Report DE 10 2022 200 603.8, dated Oct. 21, 2022. (16 pages).

* cited by examiner

*Primary Examiner* — Kelsey E Cary
(74) *Attorney, Agent, or Firm* — Dority & Manning, P.A.

(57) ABSTRACT

A mounting aid device for mounting a valve slide in a housing bore of a valve housing of a slide valve includes a mounting slide arranged movably in a guide of a guide piece and protruding out of the guide of the guide piece on both sides. The guide piece includes a first stop, with which the guide piece is placeable coaxially to the housing bore when the guide piece contacts the valve housing at the first stop. The mounting slide configured to protrude into the housing bore until contact on the second end region of the valve slide and, by force-loading of the mounting slide under compression of the spring element, the valve slide is movable until the valve slide reaches the first end position.

10 Claims, 5 Drawing Sheets

SLIDE VALVE AND MOUNTING AID DEVICE

CROSS-REFERENCE TO RELATED APPLICATION

The present application is related and claims priority to 102022200603.8 filed in the German Patent Office on Jan. 20, 2022, which is incorporated by reference in its entirety for all purposes.

FIELD OF THE INVENTION

The invention relates generally to a slide valve and mounting aid device for mounting a valve slide in a housing bore of a valve housing of the slide valve.

BACKGROUND

In slide valves, first the spring elements and then the valve slides are inserted in the corresponding housing bores, and then pressed down by a mounting aid device. In the down-pressed state, a stop element is then inserted which can also close the housing bore. It is then very difficult or even impossible to establish whether the spring element and/or valve slide have been correctly fitted in the housing bore, or whether one of these parts is missing.

SUMMARY OF THE INVENTION

Example aspects of the invention provide a slide valve and mounting aid device for mounting a valve slide in a housing bore of a valve housing of the slide valve. The valve slide is force-loaded at a first end region of the valve slide by a pretensioned spring element supported on the valve housing, and the second end region of the valve slide can be loaded by an actuating force against the force of the spring element, with a first end position in which the axial movement of the valve slide is limited when the spring element is compressed, and with a second end position in which the movement travel of the valve slide is limited when the spring element is not compressed. The housing bore on the side opposite the spring element opens coaxially to the outside and can be closed. The mounting aid device is simply constructed, can be operated with low forces, and the correct installation of the spring element and/or valve slide in the housing bore can be established.

According to example aspects of the invention, the mounting aid device has a mounting slide which is arranged movably in a guide of a guide piece and protrudes out of the guide of the guide piece on both sides. The guide piece has a first stop with which the guide piece with guide can be placed coaxially to the housing bore for contact on the valve housing. The mounting slide protrudes into the housing bore until contact on the second end region of the valve slide. By force-loading of the mounting slide under compression of the spring element, the valve slide can be moved until the valve slide reaches the first end position.

By placing the guide piece on the valve housing, the position of the guide piece relative to the valve housing is precisely defined. Then, the mounting slide can be moved until the mounting slide makes contact with the valve slide while the spring element is not compressed, then, if a specific greater length of the mounting slide protrudes from the guide piece at the end facing away from the valve housing, it can be immediately visually detected and established that mounting has been performed correctly to that point.

If now, by compression of the spring element by the actuating force, the mounting slide can be moved inward until a specific shorter length of the mounting slide protrudes from the guide piece at the end facing away from the valve housing, it can also be visually detected that the spring element and valve slide are correctly fully mounted.

If, for example, the spring element is tilted or the valve slide blocked, the mounting slide cannot be moved far enough for the end of the mounting slide facing away from the valve housing to protrude from the guide piece to the specific short length, which indicates that the mounting of the spring element and/or valve slide is not correct.

In simple compact fashion, the spring element may be a helical spring.

If the end of the helical spring nearest the valve slide protrudes into a base bore of the valve slide, it receives guidance and cannot buckle as quickly.

A stop element can be mounted on the valve housing, on which the valve slide is in contact in the second end position, which thus limits the stroke of the valve slide in the direction away from the spring element.

The stop element may simultaneously serve as a closing element for the housing bore.

To move the valve slide against the force of the spring element, the second end region of the valve slide can be loaded with a hydraulic pressure.

If the mounting slide has a coaxially protruding pin on an end region of the mounting slide facing the valve slide, by which the valve slide can be loaded by the mounting slide, the friction between the mounting slide and the valve slide is minimized and installation space created for mounting the stop element.

The opening region of the housing bore opening towards the outside may be provided with a thread.

Here, the outwardly opening housing bore can be closed by a screw plug.

It is also possible that, at the end region of the guide piece which can be placed on the valve housing, the guide piece has a threaded connector which can be screwed into the thread of the housing bore.

For simple force-loading of the mounting slide by an operator, the mounting slide preferably has an actuating knob at the end of the mounting slide protruding outward from the guide of the guide piece.

BRIEF DESCRIPTION OF THE DRAWINGS

An exemplary embodiment of the invention is shown in the drawing and described in more detail below. In the drawings.

DETAILED DESCRIPTION

Figure 1:
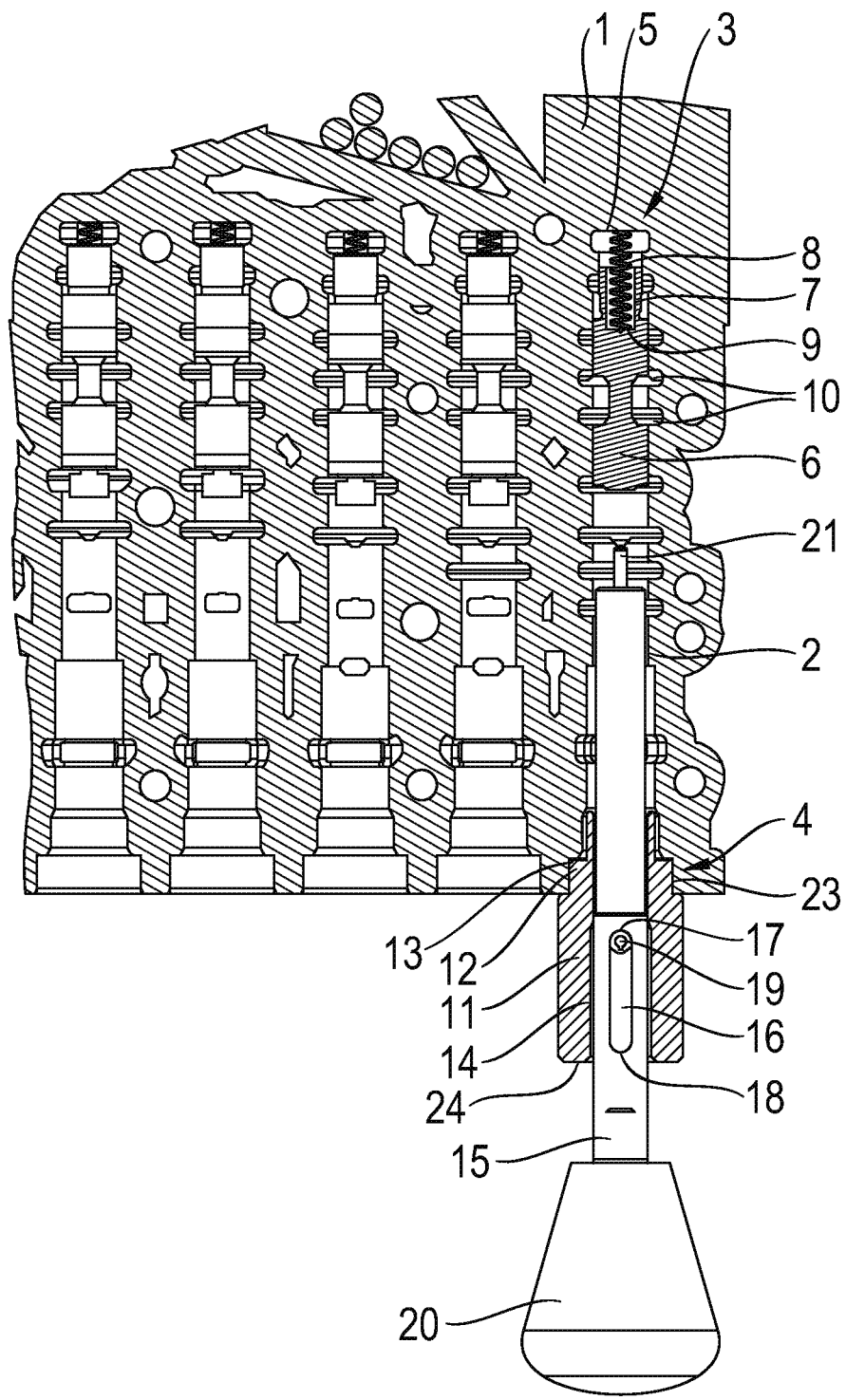
FIG. 1 shows a longitudinal section of a slide valve and mounting aid device in a starting state.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The slide valves shown in the figures have a valve housing 1 in which a housing bore 2 is formed.

The housing bore 2 is closed at a lower end 3 of the housing bore 2 by a floor 5 and opens outward at an upper end 4 of the housing bore 2.

Several valve pockets, which open radially into the housing bore 2, are formed in the valve housing at axial distances from one another.

A valve slide 6 is movably arranged in the housing bore 2 and, on a cylindrical casing surface of the valve slide 6, is provided with radially circumferential control grooves (not shown) spaced apart from one another.

At an end of the valve slide 6 facing the floor 5, the valve slide 6 has a base bore 7 coaxial to the longitudinal extent of the valve slide 6; a part of the length of a helical compression spring 8 is inserted in the base bore 7 and one end of the compression spring 8 rests on the base 9 of the base bore 7. The other part of the helical compression spring 8 protrudes from the base bore 7 and is supported on the floor 5.

A mounting aid device 22 has a guide piece 11 of round cross-section, which at an end region has a cylindrical step 12 of reduced diameter, wherein the diameter of the cylindrical step 12 corresponds to the diameter of the housing bore 2 at the upper end 4. The radial transition from the step 12 to the region of the guide piece 11 with greater radial extent forms a third stop 13.

Coaxially to the cylindrical step 12, a continuous guide 14 formed as a guide bore is made in the guide piece 11; a mounting slide 15 is movably arranged therein and protrudes from the guide piece 11 at both ends of the guide 14. The mounting slide 15 has a through-slot 16 transversely to the longitudinal extent of the mounting slide 15, and the longitudinal extent thereof corresponds to the longitudinal extent of the mounting slide 15.

A stop pin 19 extends through the slot 16 transversely to the longitudinal extent of the mounting slide 15, and the ends of the stop pin 19 protrude into bores of corresponding diameter in the guide piece 11 where the stop pin 19 is secured.

The end of the slot 16 closest to the housing bore 2 forms a first stop 17, and the end of the slot 16 further away from the housing bore 2 forms a second stop 18, wherein the mounting slide 15 is movable in the guide 14 by an axial movement travel which is defined by the contact of the stop pin 19 on the stops 17 and 18.

An actuating knob 20 is arranged at the end of the mounting slide 15 protruding outward from the guide.

At the end of the mounting slide 15 protruding from the housing bore 2, the mounting slide 15 has a coaxially protruding pin 21.

In the illustration of FIG. 1, the valve slide 6 with the helical compression spring has already been introduced into the housing bore 2, and the mounting aid device 22 placed on the valve housing 1 such that the guide piece 11 protrudes into the upper end 4 of the housing bore 2 provided with a widened step 23, and with the third stop 13 of the guide piece 11 comes into contact with the radial transition from the widened step 23 to the housing bore 2, and the mounting slide 15 protrudes into the housing bore 2. The stop pin 19 comes to rest on the first stop 17.

Figure 2:
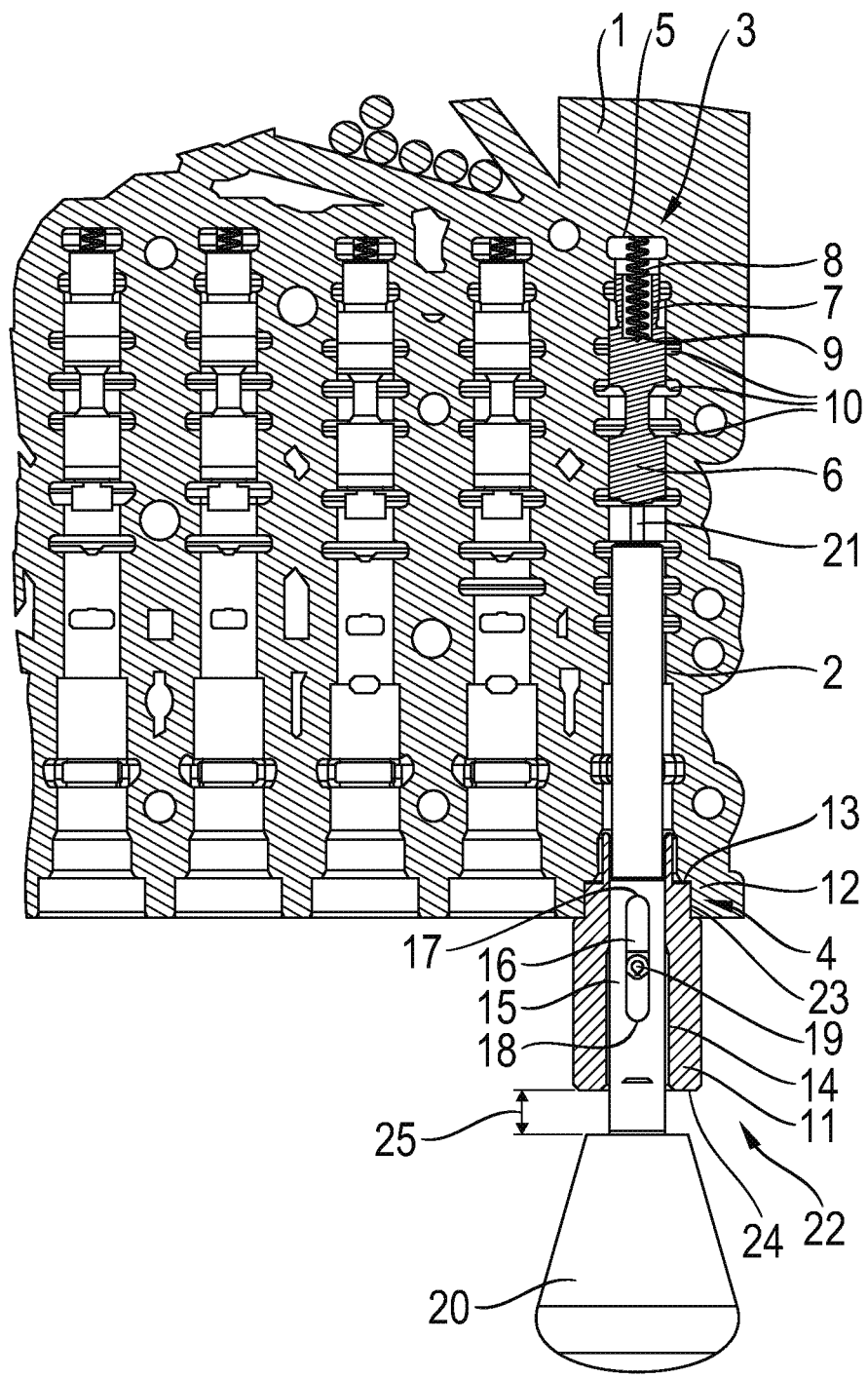
FIG. 2 shows a longitudinal section of the slide valve and mounting aid device from FIG. 1 in a second end position of the valve slide.

Now by application of force on the actuating knob 20, the mounting slide 15 can be moved inward until the pin 21 makes contact with the end face of the valve slide 6 facing the pin 21 (FIG. 2). There is still a first distance 25 of for example ten millimeters (10 mm) between the actuating knob 20 and the end face of the guide piece 11 facing away from the valve housing 1.

Figure 3:
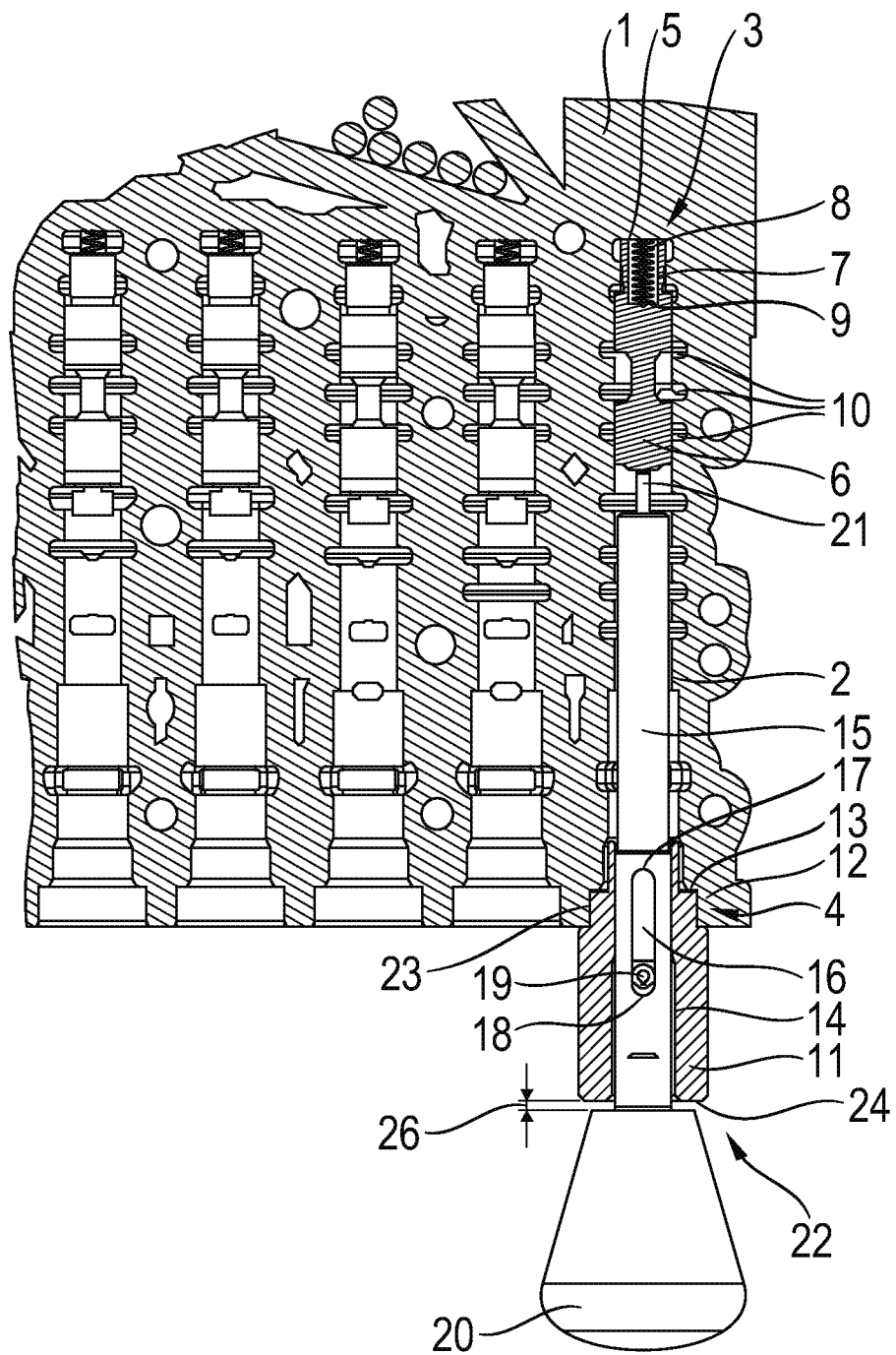
FIG. 3 shows a longitudinal section of the slide valve and mounting aid device from FIG. 1 in a first end position of the valve slide.

On application of further force on the actuating knob 20, the pin 21 of the mounting slide 15 moves the valve slide 6 against the force of the helical compression spring 8 into a first end position, in which only a second distance 26 of e.g. one and a half millimeters (1.5 mm) exists between the actuating knob 20 and the end face 24 of the guide piece 11 facing away from the valve housing 1 (FIG. 3).

Owing to the counter-force of the helical compression spring 8, the person operating the actuating knob 20 receives haptic feedback to indicate whether the helical compression spring 8 is actually installed. If the helical compression spring 8 were missing, the actuating knob 20 would come into contact with the guide piece 11 and the mounting slide 15 would not be compressed accordingly.

If the helical compression spring 8 were not sitting correctly in the base bore 7 of the valve slide 6, the mounting slide 15 would not be compressed and the person operating the actuating knob would immediately feel a resistance. In addition, the distance between the actuating knob 20 and the end face of the guide piece 11 facing away from the valve housing 1 would be greater than the second distance 26, which would be immediately be evident visually.

Figure 4:
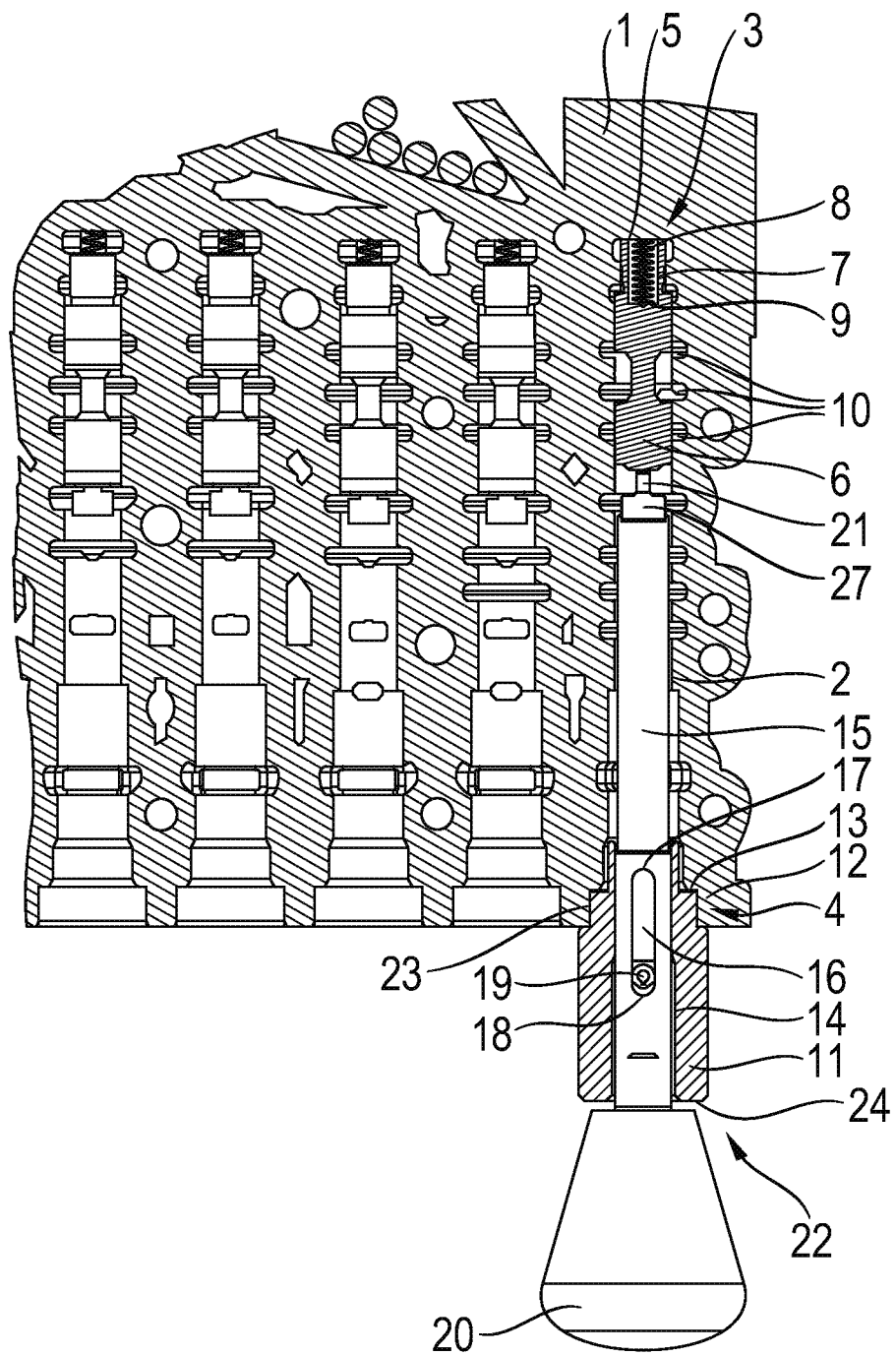
FIG. 4 shows a longitudinal section of the slide valve and mounting aid device from FIG. 1 after insertion of a stop element.

If the person carrying out the installation establishes that the helical compression spring 8 and valve slide are correctly installed, a stop element 27 resting on the valve housing 1 is inserted in the housing bore 2 and fixed; on movement under the force of the helical compression spring 8, the valve slide 6 then rests thereon in the second end position of the valve slide 6 (FIG. 4).

Figure 5:
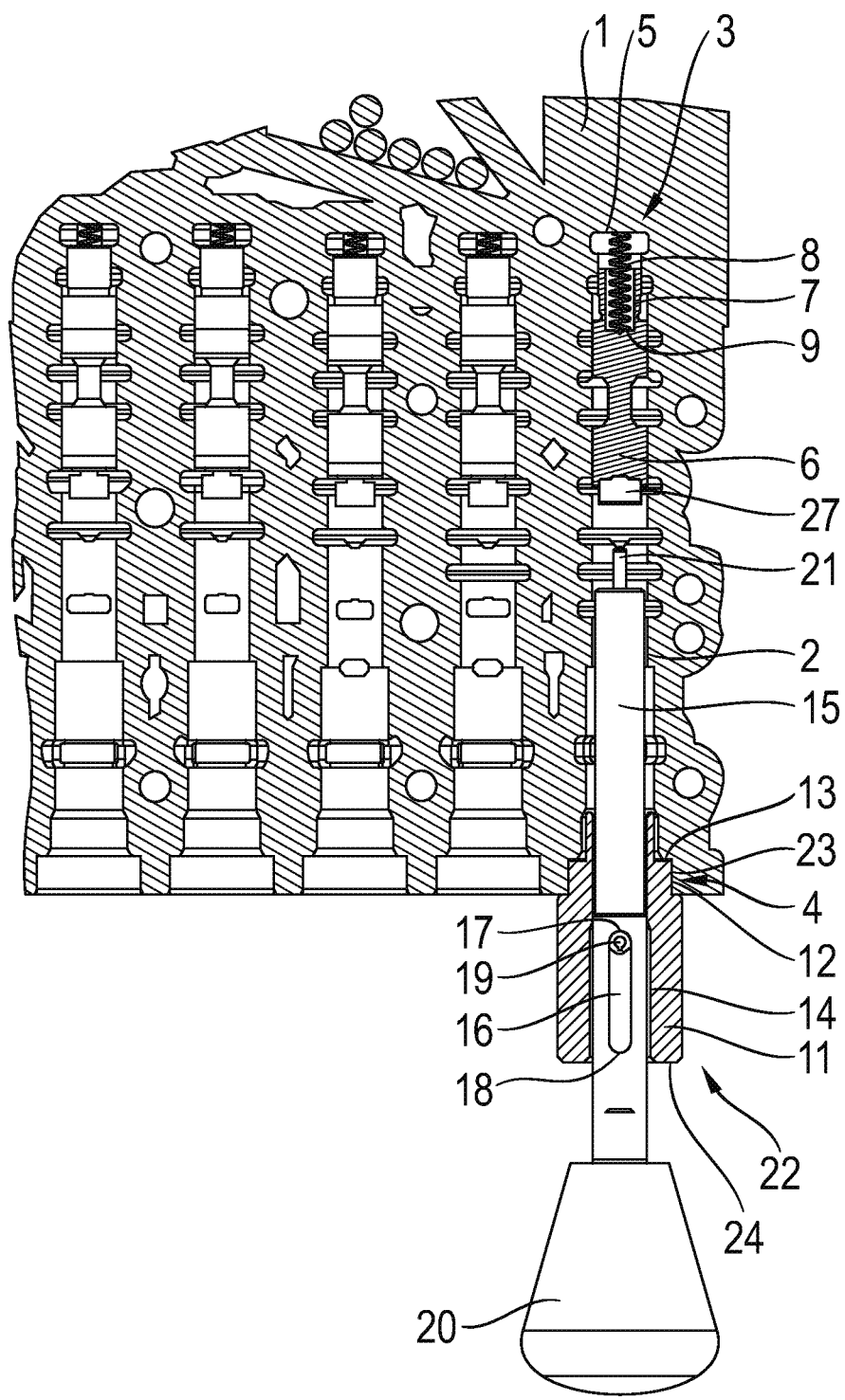
FIG. 5 shows a longitudinal section of the fully mounted slide valve and mounting aid device from FIG. 1.

Now by the actuating knob 20, the mounting slide 15 can be moved in the outward direction until the stop pin 19 comes into contact with the first stop 17 (FIG. 5).

The mounting device 22 can now be removed from the housing bore 2 and the outward opening of the housing bore 2 can be closed by e.g. a plug.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

LIST OF REFERENCE SIGNS

1 Valve housing
2 Housing bore

3 Lower end
4 Upper end
5 Floor
6 Valve slide
7 Base bore
8 Helical compression spring
9 Base
10 Valve pockets
11 Guide piece
12 Step
13 Third stop
14 Guide
15 Mounting slide
16 Slot
17 First stop
18 Second stop
19 Stop pin
20 Actuating knob
21 Pin
22 Mounting aid device
23 Wider step
24 End face
25 First distance
26 Second distance

The invention claimed is:

1. A mounting aid device (22) for mounting a valve slide (6) in a housing bore (2) of a valve housing (1) of a slide valve, wherein the valve slide (6) is force-loaded at a first end region of the valve slide (6) by a pretensioned spring element supported on the valve housing (1) and the second end region of the valve slide (6) is loadable by an actuating force against the force of the spring element, wherein the valve slide (6) is movable between a first end position and a second end position, axial movement of the valve slide (6) is limited when the spring element is compressed in the first end position of the valve slide (6), and movement travel of the valve slide (6) is limited when the spring element is not compressed in the second end position of the valve slide (6), and wherein the housing bore (2) on a side opposite the spring element opens coaxially to an exterior and is closable, the mounting aid device (22) comprising:

a guide piece (11);
a mounting slide (15) arranged movably in a guide (14) of the guide piece (11), the mounting slide (15) protruding out of the guide (14) of the guide piece (11) on both sides of the guide (14);
wherein the guide piece (11) comprises a first stop (17) and a second stop (18) with an elongated slot (16) extending axially between the first and second stops (17,18),
wherein the guide piece (11) comprises a third stop (13), the guide piece (11) with the guide (14) placeable coaxially to the housing bore (2) when the third stop (13) of the guide piece (11) contacts the valve housing (1),
wherein a stop pin (19) is connected to the guide piece (11), the stop pin (19) extending transversely to a longitudinal extension of the mounting slide (15) through the elongated slot (16) of the guide piece (11), the mounting slide (15) movable along an axial path delimited by translation of the stop pin (19) in the elongated slot (16) of the guide piece (11) between the first and second stops (17,18),
wherein the mounting slide (15) is extendable into the housing bore (2) in order to contact the second end region of the valve slide (6) when the third stop (13) of the guide piece (11) contacts the valve housing (1), and
wherein, by force-loading of the mounting slide (15) under compression of the spring element, the valve slide (6) is movable with the mounting slide (15) until the valve slide (6) reaches the first end position.

2. The mounting aid device of claim 1, wherein the spring element is a helical spring (8).

3. The mounting aid device of claim 2, wherein an end of the helical spring (8) nearest the valve slide protrudes into a base bore (7) of the valve slide (6).

4. The mounting aid device of claim 1, wherein a stop element (26) is mountable on the valve housing (1), and the stop element (26) contacts the valve slide (6) in the second end position.

5. The mounting aid device of claim 1, wherein the second end region of the valve slide (6) is loadable with a hydraulic pressure.

6. The mounting aid device of claim 1, wherein the mounting slide (15) comprises a coaxially protruding pin (21) on an end region of the mounting slide (15) facing the valve slide (6), the valve slide (6) loadable by the mounting slide (15) by the coaxially protruding pin (21).

7. The mounting aid device of claim 1, wherein an opening region of the housing bore (2) that opens towards the exterior comprises a thread.

8. The mounting aid device of claim 7, wherein the opening region of the housing bore (2) is closable by a screw plug on the thread of the housing bore.

9. The mounting aid device of claim 7, wherein, at an end region of the guide piece (11) placeable on the valve housing, the guide piece (11) comprises a threaded connector screwable to the thread of the housing bore.

10. The mounting aid device of claim 1, wherein the mounting slide (15) comprises an actuating knob (20) at an end of the mounting slide (15) protruding outwardly from the guide (14) of the guide piece (11).

* * * * *